United States Patent
Raghavan (10) Patent No.: US 9,842,074 B2
(45) Date of Patent: Dec. 12, 2017

(54) TAG ALLOCATION FOR NON-POSTED COMMANDS IN A PCIE APPLICATION LAYER

(71) Applicant: AVAGO TECHNOLOGIES GENERAL IP (SINGAPORE) PTE. LTD., Singapore (SG)

(72) Inventor: Ramprasad Raghavan, Colorado Springs, CO (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 316 days.

(21) Appl. No.: 14/610,648

(22) Filed: Jan. 30, 2015

(65) Prior Publication Data

US 2016/0224487 A1    Aug. 4, 2016

(51) Int. Cl.
  *G06F 13/00*    (2006.01)
  *G06F 13/362*   (2006.01)
  *G06F 13/42*    (2006.01)
  *G06F 9/44*     (2006.01)

(52) U.S. Cl.
  CPC ......... *G06F 13/362* (2013.01); *G06F 9/4411* (2013.01); *G06F 13/4221* (2013.01)

(58) Field of Classification Search
  USPC ................................. 710/104–110, 305–317
  See application file for complete search history.

(56) References Cited

U.S. PATENT DOCUMENTS

| | | | | |
|---|---|---|---|---|
| 6,681,274 B2 * | 1/2004 | Ennis | .................. | G06F 13/4036 710/5 |
| 7,454,551 B2 * | 11/2008 | Myers | ..................... | G06F 9/466 710/310 |
| 7,979,592 B1 * | 7/2011 | Pettey | ................... | G06F 13/404 709/205 |
| 8,356,124 B1 * | 1/2013 | Davis | .................... | G06F 13/362 370/438 |
| 8,521,941 B2 * | 8/2013 | Regula | .................. | G06F 13/404 710/105 |
| 8,543,754 B2 * | 9/2013 | Glass | .................... | G06F 3/0659 710/310 |

(Continued)

OTHER PUBLICATIONS

Stratix V Avalon-ST Interface with SR-IOV Pcie Solutions User Guide, Altera, Dec. 15, 2014.

*Primary Examiner* — Raymond Phan
(74) *Attorney, Agent, or Firm* — Sheridan Ross P.C.

(57) ABSTRACT

Embodiments herein provide for tag allocation in a PCIe application layer. In one embodiment, an apparatus operable to interface with a plurality of virtual functions and a plurality of physical functions to process data via the PCIe protocol. The apparatus includes a packet builder communicatively coupled to each of the virtual functions and the physical functions and operable to build packets for non-posted commands from the virtual and physical functions. The apparatus also includes a tag allocator operable to allocate tags from a first set of tags to the packets of non-posted commands from any of the virtual and physical functions employing extended tags when the tags of the first set are available, and to reserve a second different set of tags for remaining virtual and physical functions not employing extended tags until the first set of tags are all allocated.

21 Claims, 6 Drawing Sheets

(56) References Cited

U.S. PATENT DOCUMENTS

| | | | |
|---|---|---|---|
| 8,881,150 B2* | 11/2014 | Sawa | G06F 13/102 |
| | | | 718/1 |
| 8,918,568 B2* | 12/2014 | Ayzenfeld | G06F 13/14 |
| | | | 710/104 |
| 2003/0097500 A1* | 5/2003 | Ennis | G06F 13/4027 |
| | | | 710/52 |
| 2012/0221764 A1 | 8/2012 | Glass et al. | |
| 2012/0284437 A1 | 11/2012 | Ayzenfeld et al. | |

* cited by examiner

TAG ALLOCATION FOR NON-POSTED COMMANDS IN A PCIE APPLICATION LAYER

FIELD OF THE INVENTION

The invention generally relates to Peripheral Component Interface Express (PCIe) devices.

BACKGROUND

PCIe employs virtualization in what is known as Single Root-Input/Output Virtualization (SR-IOV) comprising virtual functions (VFs) and physical functions (PFs). The VFs and PFs communicate in the PCIe environment via packets of posted transactions and non-posted transactions (also known as "commands"). Non-posted commands, such as read and write Input/Outputs (I/Os), are those where a requesting VF or PF (i.e., a requester) expects to receive a completion Transaction Layer Packet (TLP) when the command is completed. Posted commands, such as memory writes and messages, are those where the requester does not expect to and will not receive a completion TLP even if an error occurs. An application layer generates an incrementing sequence number, or "tag", for each outgoing packet of a command that serves as a unique identification for the transmitted packet. However, current tagging in PCIe can be problematic because it can create congestion among competing VFs and PFs in the PCIe environment.

SUMMARY

Systems and methods herein provide for tag allocation in a PCIe application layer. In one embodiment, an apparatus is operable to interface with a plurality of VFs and a plurality of PFs to process data via the Peripheral Component Interface Express (PCIe) protocol. The apparatus includes a packet builder communicatively coupled to each of the VFs and the PFs and operable to build packets for non-posted commands from the VFs and PFs. The apparatus also includes a tag allocator operable to allocate tags from a first set of tags to the packets of non-posted commands from any of the VFs and PFs employing extended tags when the tags of the first set are available, and to reserve a second different set of tags for remaining VFs and PFs not employing extended tags until the first set of tags are all allocated.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software and firmware, are described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Figure 1:
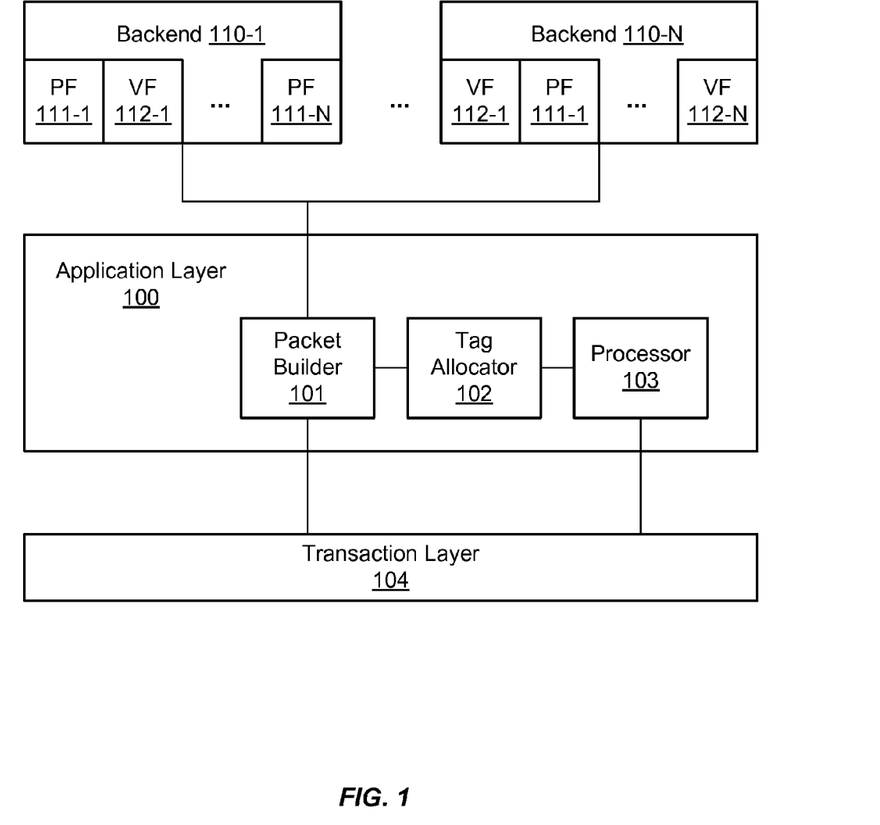
FIG. 1 is a block diagram of an exemplary PCIe application layer.

FIG. 1 is a block diagram of an exemplary PCIe application layer 100. The PCIe application layer 100 may be operable on any PCIe device or system to interface with a plurality of backend functions or devices 110-1-110-N (also known as system images and collectively referred to herein as "backends"; wherein "N" is an integer greater than "1" and not necessarily equal to any other "N" reference designated herein). Each of the backends 110 is operable to present a plurality of PFs 111 and/or VFs 112 using the SR-IOV features of the PCIe protocol. The host system views these backends 110 via their various PFs 111 and VFs 112 as individual devices.

Each PF 111 and each VF 112 of a backend 110 can support a number of outstanding requests. For example, if a PF 111 can handle more than 32 outstanding requests, the application layer 100 establishes that PF 111 as having extended tags enabled. Otherwise the application layer 100 designates the PF 111 as having its extended tags disabled (e.g., ExtendedTagEn=0, also known as ExtendedTagEn reset) and the application layer 100 generates tag values that are five bits in length for each non-posted command from the PF 111. The same occurs for each VF 112. For simplicity, the PFs 111 and VFs 112 will be collectively referred to as functions 111/112.

The application layer 100 can be configured as a single queue structure where a request from a function 111/112 is arbitrated before a command is packetized via a packet builder 101 and transmitted to the transaction layer 104 and ultimately to the host. Alternatively, the application layer 100 can have independent queues that service each function 111/112 wherein arbitration occurs as packets are configured by the packet builder 101 and transmitted to the transaction layer 104. Each of these is described in greater detail below in FIGS. 4 and 5.

In any case, the tag allocator 102 generates a unique tag for each of the commands of the functions 111/112. As mentioned, there are two types of commands from the functions 111/112, non-posted command and posted commands. Completions are returned in response to non-posted commands and processed by a processor 103. Then, the processor 103 matches a completion tag with each range of tags to determine which queue it belongs to.

Previously, the queue structures became congested as the functions 111/112 arbitrated for tags. For example, in a shared queue implementation, tags were allocated sequentially starting from "0". If commands that support extended tags from a function 111/112 occupy the first 32 slots of the queue, then any function that has extended tags disabled is precluded from sending commands until one of the first 32 slots of the queue is freed.

In the independent queue structure implementation, each queue manages the tag ranges allocated to them. If a backend 110 with a function 111/112 has extended tags disabled, then the backend 110 needs to connect to the 0-31 range in the queue. Accordingly, if more than one function exists with extended tags disabled, then the lower 32 tags of this range are divided, thereby restricting the function 111/112 from utilizing its full capacity for sending outstanding requests. And, as the tags are fixed in hardware, the function 111/112's capacity to send outstanding requests cannot be changed at runtime.

The application layer 100 of this embodiment addresses these congestion problems of non-posted commands by employing a centralized tag allocator 102. And, for functions 111/112 having extended tags enabled, the tag allocator 102 will allocate those tags as they come available. The tag allocator 102 also reserves the lower 32 tags for functions 111/112 where extended tags are disabled until all of the higher order tags are used by the functions 111/112 that support extended tags. One exemplary process for tag allocation is now shown and described in FIG. 2.

Figure 2:
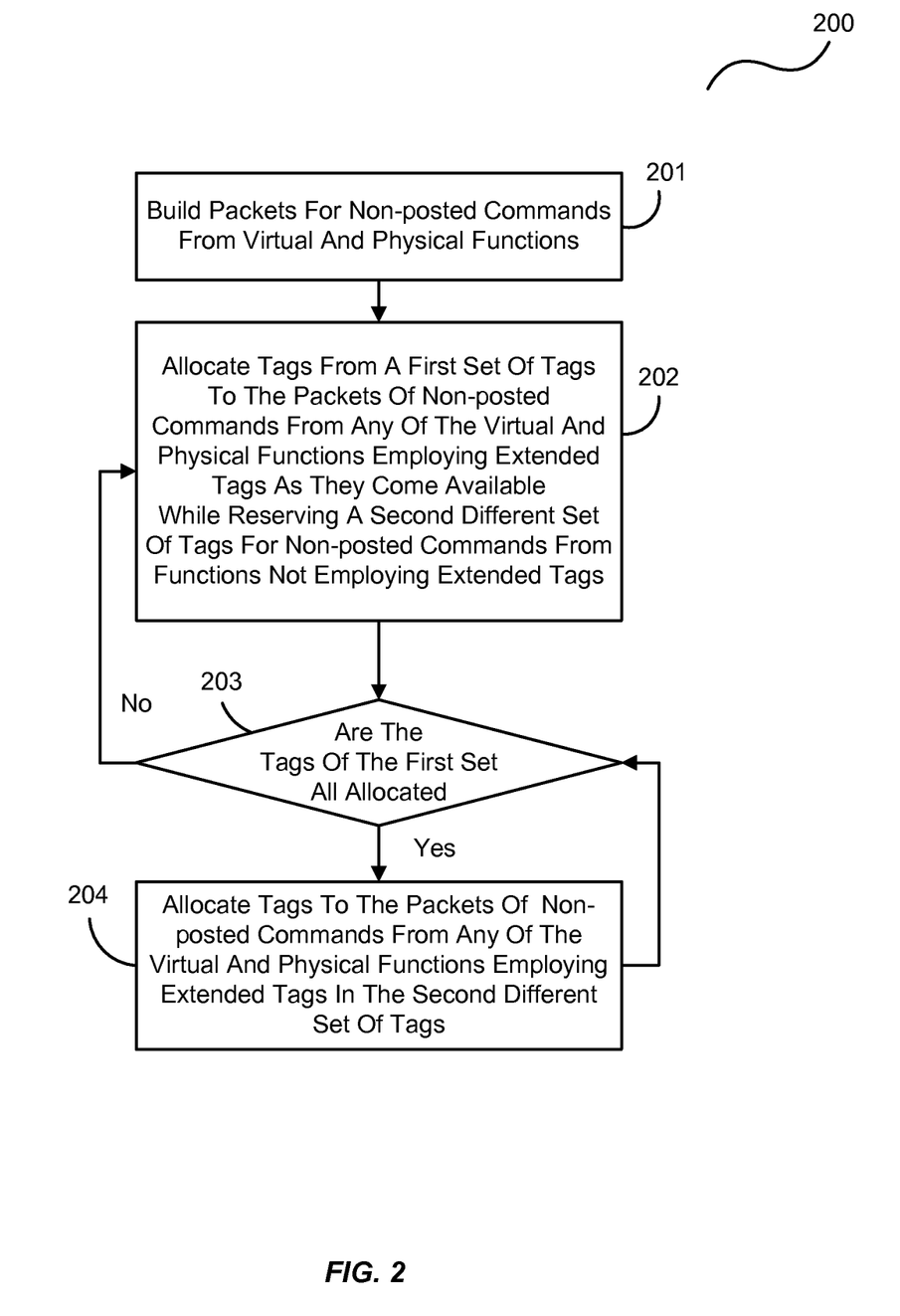
FIG. 2 is a flowchart of an exemplary process of the PCIe application layer of FIG. 1.

FIG. 2 is a flowchart of an exemplary process 200 of the PCIe application layer 100 of FIG. 1. In this embodiment, it is assumed that the application layer 100 is operational and building packets for commands from the functions 111/112, in the process element 201. And, while the embodied tag allocation may be relevant to all commands issued from the functions 111/112, the process 200 specifies tag allocations from non-posted commands as these commands receive completions from the host. That is, posted commands are not notified of completions and therefore there is no need for completion tag comparison.

In the process element 202, the tag allocator 102 allocates tags from a first set of tags to the packets of non-posted commands from any of the functions 111/112 employing extended tags as the tags come available. In this regard, the tag allocator 102 reserves a second set different set of tags (e.g., a lower set of tags from 0 to 31) for use by functions 111/112 not employing extended tags. The tag allocator 102 continually monitors the queue to determine whether all of the tags of that first set have been allocated, in the process element 203. If all of the tags have not been allocated, then the tag allocator 102 continues to allocate tags, in the process element 202. Otherwise, the tag allocator 102 allocates tags to the packets of the non-posted commands from any of the functions 111/112 in the second different set of tags, in the process element 204. In this regard, the tag allocator 102 reserves the second set of tags for the functions 111/112 employing extended tags while the first set of tags are unavailable.

The tag allocator 102 continues to monitor the queue to determine whether tags come available. For example, once tags above 31 are available for the commands of the functions 111/112, the tag allocator 102 will relinquish the reservation on the second different set of tags such that the commands not employing extended tags can use the second set of tags.

Figure 3:
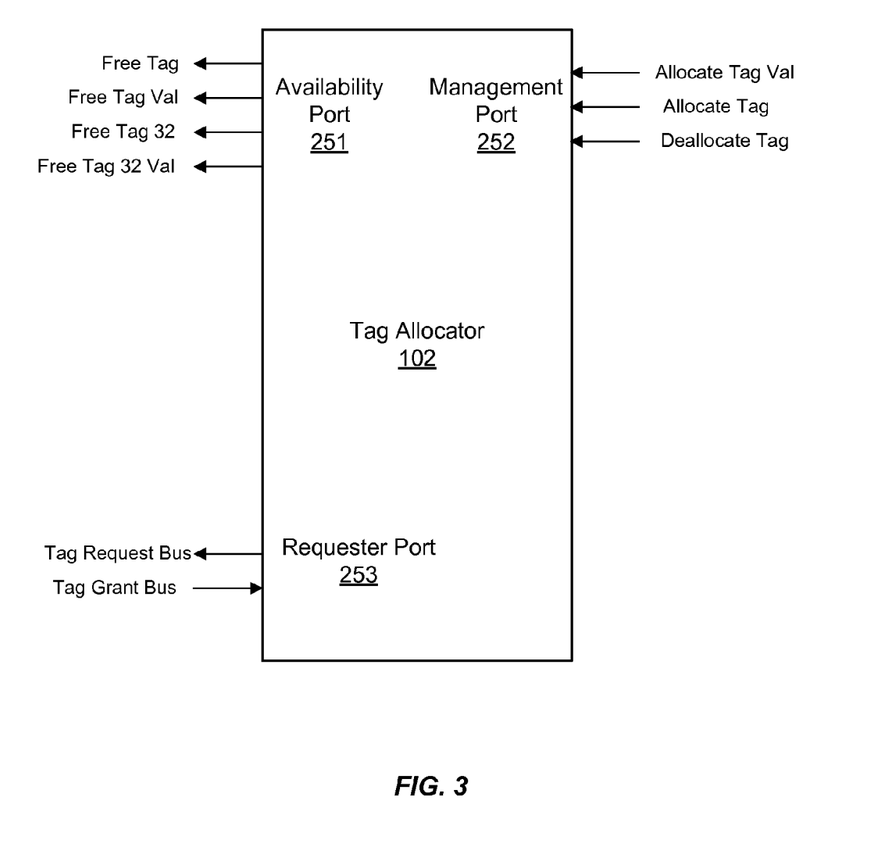
FIG. 3 is a block diagram of an exemplary tag allocator.

FIG. 3 is a block diagram of an exemplary tag allocator 102. The tag allocator 102, in this embodiment, comprises two sets of availability ports 251, the Free Tag 32 port and the Free Tag port. The Free Tag 32 port advertises any free tag less than 32. The Free Tag port advertises any free tag greater than or equal to 32. If all tags greater than or equal to 32 are used, then the Free Tag port advertises any free tag that is less than 32.

The command queue (shown and described in greater detail below in FIGS. 4 and 5) makes a request for tag on a request report 253 of the tag allocator 102. Once granted, the tag allocator 102 determines whether the command has extended tags enabled (e.g., ExtendedTagEn =1) as well as whether the free tag value has been enabled (i.e., Free Tag Val=1). If so, the tag allocator 102 allocates a free tag via an Allocate Tag port of the management port 252. If extended tags are disabled (e.g., ExtendedTagEn=0) and the Free Tag 32 Val=1 on the availability port 251, then the tag allocator 102 allocates a Free Tag 32 via the allocate tag port of the management port 252. The commands are then transferred from the command queue to the transaction layer 104 for processing by the host system. Once completed, the host system issues a completion tag that is compared to the command queue such that the tag allocator 102 can deallocate/relinquish the tag for use by another command.

Figure 4:
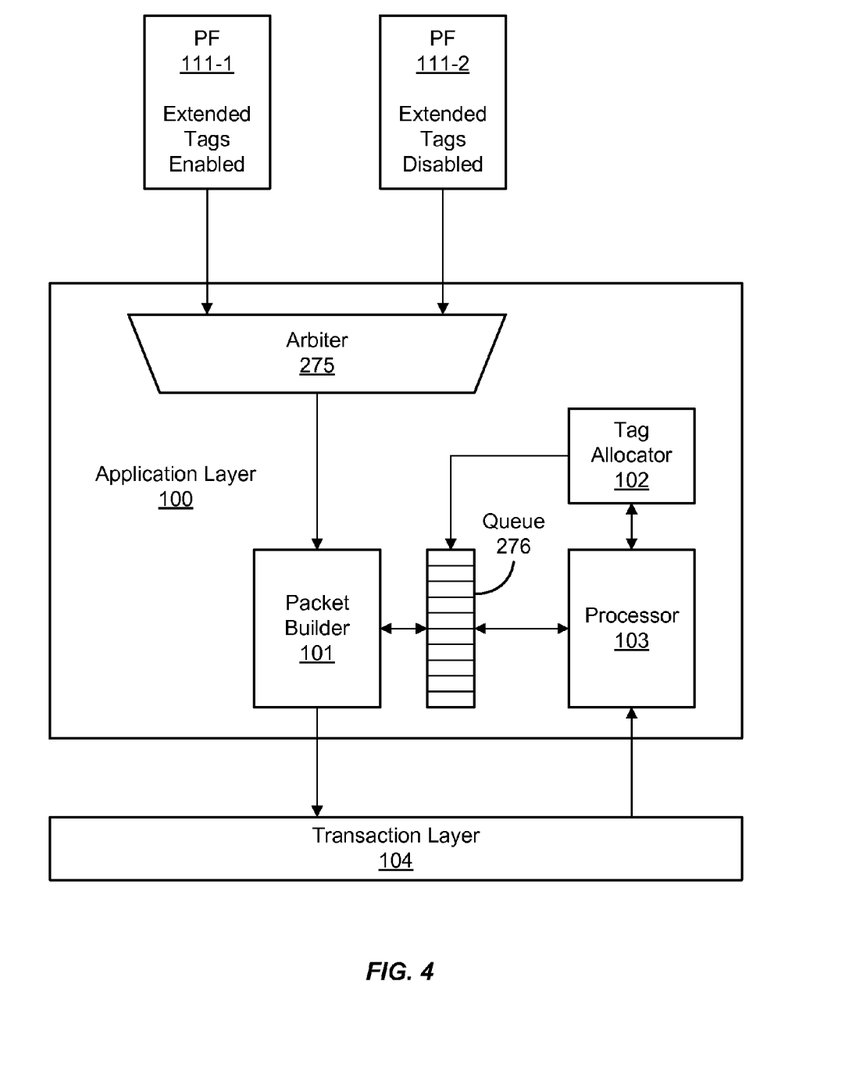
FIGS. 4 and 5 are block diagrams of exemplary implementations of the tag allocator in a PCIe application layer.
Figure 5:
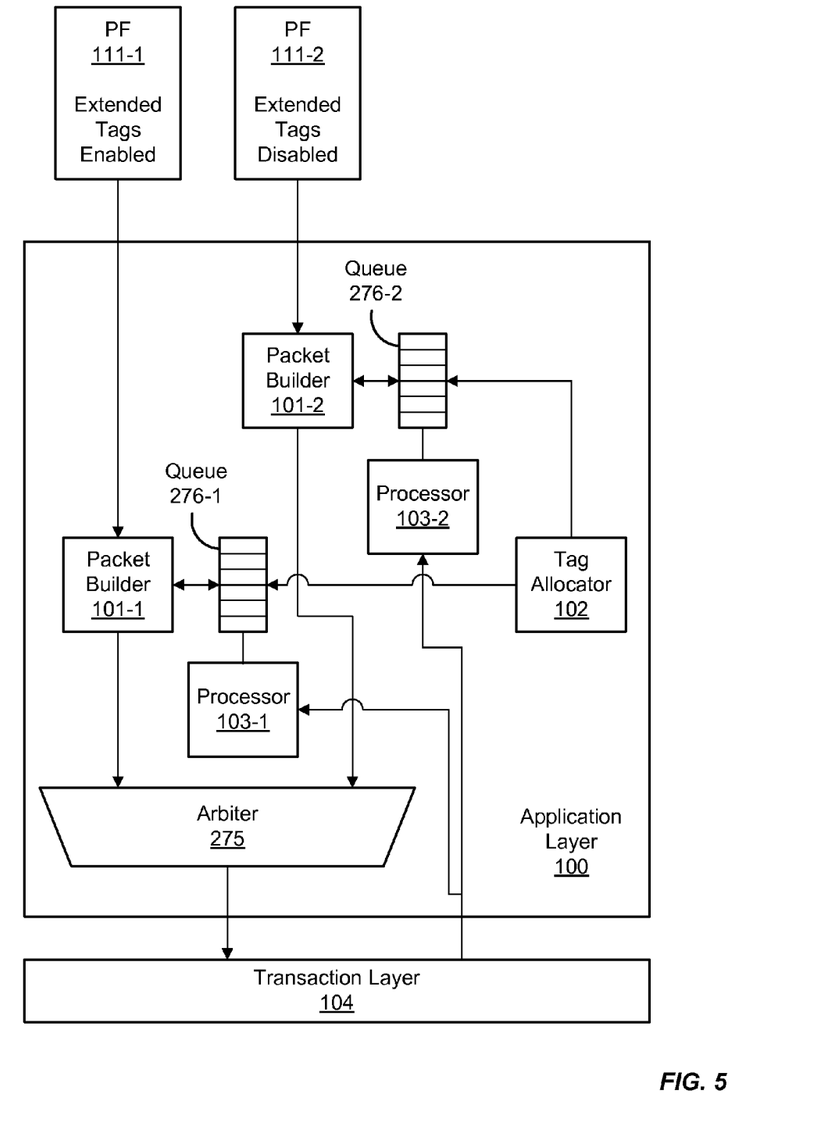

FIGS. 4 and 5 are block diagrams of exemplary implementations of the tag allocator 102 in a PCIe application layer 100. In FIG. 4, the application layer 100 is configured with a single command queue 276 for non-posted commands from the PFs 111-1 and 111-2. In this example, the PF 111-1 has extended tags enabled and the PF 111-2 has extended tags disabled. Thus, the tag allocator 102 reserves the lower tags 0 to 31 for commands from the PF 111-2 until all of the commands from the PF 111-1 have been allocated.

If all the commands from the PF 111-1 (or any other functions 111/112 with extended tags enabled) have been allocated, then the tag allocator 102 begins to allocate the lower tags 0 to 31 until an extended tag comes available. This occurs when the command is packetized by the packet builder 101 and transferred to the transaction layer 104 for processing by the host system and a completion tag is returned to the processor 103 for comparison to the command queue 276. The processor 103 then informs the tag allocator 102 that the tag has been returned and can now be reallocated as an extended tag.

In FIG. 5, each of the PFs 111-1 and 111-2 is configured with its own packet builder 101 and command queue 276. The centralized tag allocator 102 issues tags one at a time from the command queues 276-1 and 276-2. Again, the tag allocator 102 reserves the lower level tags 0 to 31 until all of the tags by the command queue 276-1 have been used. If all of the tags greater than or equal to 32 are all used (i.e., the extended tags), the tag allocator 102 then issues tags in the range 0 to 31 to the command queue 276-1 as needed until an extended tag comes available. Again, an extended tag comes available when a completion tag is returned from the host system through the transaction layer 104 to the processors 103-1 and 103-2.

It should be noted that the embodiments illustrated in FIGS. 4 and 5 are merely intended to be exemplary and nonlimiting. An application layer 100 can and typically will be coupled to a plurality of functions 111/112 (e.g., in the thousands). And the non-posted commands from these functions 111/112 can comprise any combination of having extended tags enabled and having extended tags disabled.

The embodiments herein provide several advantages over the prior art. For example, when tags greater than or equal to 32 are used first by functions 111/112 that have extended tags enabled, it allows the entire range of tags to be utilized when commands can be sent by both types of functions 111/112. If the application layer 100 has a dedicated queue structure, tag ranges for multiple queues are no longer needed. Accordingly, firmware can be configured to enable extended tag capability of the functions 111/112 based on what the function can support as opposed to having the same setting for all functions 111/112. Additionally, a dedicated queue structure can have varying depths for individual queues without having to care how tags will be allocated, thereby optimizing gate utilization based on a connected backend's 110 requirements.

Figure 6:
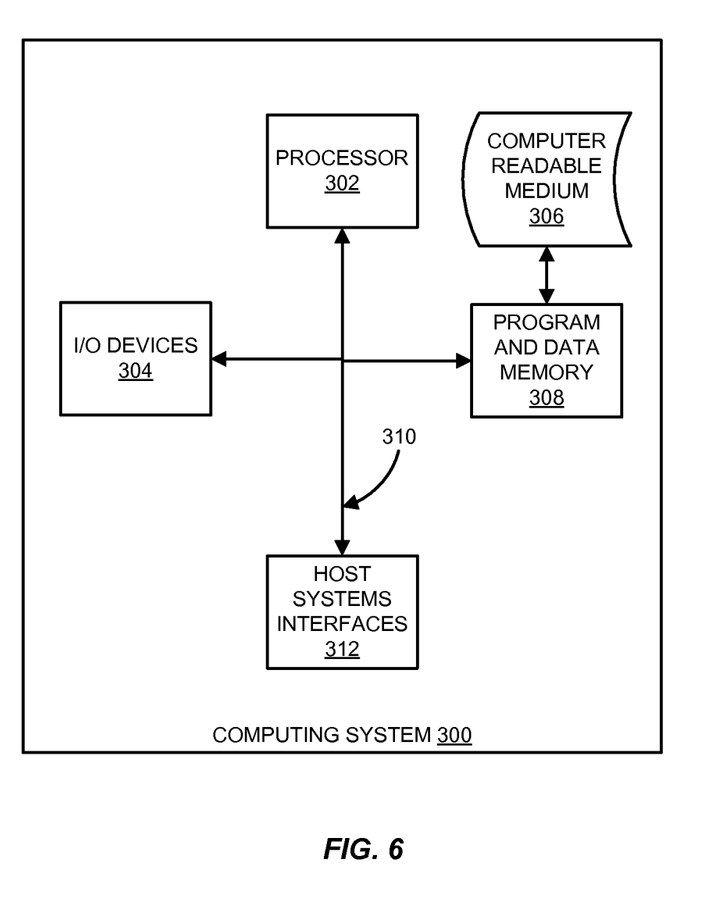
FIG. 6 illustrates an exemplary computer system operable to execute programmed instructions to perform desired functions described herein.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 6 illustrates a computing system 300 in which a computer readable medium 306 may provide instructions for performing any of the methods disclosed herein.

Furthermore, the invention can take the form of a computer program product accessible from the computer readable medium 306 providing program code for use by or in connection with a computer or any instruction execution system. For the purposes of this description, the computer readable medium 306 can be any apparatus that can tangibly store the program for use by or in connection with the instruction execution system, apparatus, or device, including the computer system 300.

The medium 306 can be any tangible electronic, magnetic, optical, electromagnetic, infrared, or semiconductor system (or apparatus or device). Examples of a computer readable medium 306 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

The computing system 300, suitable for storing and/or executing program code, can include one or more processors 302 coupled directly or indirectly to memory 308 through a system bus 310. The memory 308 can include local memory employed during actual execution of the program code, bulk storage, and cache memories which provide temporary storage of at least some program code in order to reduce the number of times code is retrieved from bulk storage during execution. Input/output or I/O devices 304 (including but not limited to keyboards, displays, pointing devices, etc.) can be coupled to the system either directly or through intervening I/O controllers. Network adapters may also be coupled to the system to enable the computing system 300 to become coupled to other data processing systems, such as through host systems interfaces 312, or remote printers or storage devices through intervening private or public networks. Modems, cable modem and Ethernet cards are just a few of the currently available types of network adapters.

What is claimed is:

1. An apparatus operable to interface with a plurality of virtual functions and a plurality of physical functions to process data via the Peripheral Component Interface Express (PCIe) protocol, the apparatus comprising:
a packet builder communicatively coupled to each of the virtual functions and the physical functions and operable to build packets for non-posted commands from the virtual and physical functions; and
a tag allocator operable to allocate tags from a first set of tags to the packets of non-posted commands from any of the virtual and physical functions employing extended tags when the tags of the first set are available, and to reserve a second different set of tags for remaining virtual and physical functions not employing extended tags until the first set of tags are all allocated.

2. The apparatus of claim 1, wherein:
the second set of tags that are reserved comprises 32 tags incremented from 0 to 31; and
the tags of the first set of tags are incremented from 32.

3. The apparatus of claim 1, wherein:
the tag allocator comprises a port operable to advertise tags that are available from the second set of tags to assign at least one free tag from the available tags.

4. The apparatus of claim 1, wherein:
the tag allocator comprises a port operable to advertise tags that are available from the first set of tags until each of the function tags from the first set are used, and, in response to all of the tags from the first set being used, the port is further operable to advertise available tags from the second set of tags.

5. The apparatus of claim 1, wherein:
the tag allocator is further operable to release an assigned tag when an associated non-posted command is complete.

6. A method operable in a Peripheral Component Interface Express (PCIe) application layer interfacing with a plurality of virtual functions and a plurality of physical functions to process data via the PCIe protocol, the method comprising:
building packets for non-posted commands from each of the virtual and physical functions;
allocating tags from a first set of tags to the packets of non-posted commands from any of the virtual and physical functions employing extended tags when the tags of the first set are available; and
reserving a second different set of tags for remaining virtual and physical functions not employing extended tags until the first set of tags are all allocated.

7. The method of claim 6, wherein:
the second set of tags comprises 32 tags incremented from 0 to 31; and
the tags of the first set of tags are incremented from 32.

8. The method of claim 6, further comprising:
advertising tags that are available from the second set of tags until each of the function tags from the first set are used.

9. The method of claim 6, further comprising:
advertising tags that are available from the first set of tags until each of the function tags from the first set are used; and,
in response to all of the tags from the first set being used, advertising available tags from the second set of tags.

10. The method of claim 6, further comprising:
releasing an assigned tag when an associated non-posted command is complete.

11. A non-transitory computer readable medium comprising instructions that, when executed on by a processor operable with a Peripheral Component Interface Express (PCIe) application layer interfacing with a plurality of virtual functions and a plurality of physical functions to process data via the PCIe protocol, directs the processor to:
build packets for non-posted commands from each of the virtual and physical functions;
allocate tags from a first set of tags to the packets of non-posted commands from any of the virtual and physical functions employing extended tags when the tags of the first set are available; and
reserve a second different set of tags for remaining virtual and physical functions not employing extended tags until the first set of tags are all allocated.

12. The computer readable medium of claim 11, wherein:
the second set of tags comprises 32 tags incremented from 0 to 31; and
the tags of the first set of tags are incremented from 32.

13. The computer readable medium of claim 11, further comprising instructions that direct the processor to:
advertise tags that are available from the second set of tags.

14. The computer readable medium of claim 11, further comprising instructions that direct the processor to:
advertise tags that are available from the first set of tags until each of the function tags from the first set are used; and,
in response to all of the tags from the first set being used, advertise available tags from the second set of tags.

15. The computer readable medium of claim 11, further comprising instructions that direct the processor to:
release an assigned tag when an associated non-posted command is complete.

16. A Peripheral Component Interface Express (PCIe) device, comprising:
a queue operable to temporarily store non-posted commands from a plurality of functions operable on the PCIe device; and
a tag allocator communicatively coupled to the queue and operable to tag non-posted commands in the queue with extended tags while reserving a set of tags for functions not employing extended tags until the extended tags are used,
wherein the queue is operable to transfer the non-posted commands to a host after the non-posted commands are tagged.

17. The PCIe device of claim 16, wherein:
the functions comprise both virtual functions and physical functions operable in a Single Root-Input/Output Virtualization (SR-IOV) PCIe environment.

18. The PCIe device of claim 16, further comprising:
a processor communicatively coupled to the tag allocator and operable to receive acknowledgement from the host that a first of the non-posted commands is complete,
wherein the tag allocator is further operable to release a first of the tags associated with the first non-posted command from the queue based on the acknowledgement.

19. The PCIe device of claim 16, wherein:
the tag allocator is further operable to monitor the queue to determine when extended tags are available.

20. The PCIe device of claim 16, further comprising:
a packet builder communicatively coupled to each of the functions and operable to build packets for the non-posted commands.

21. The PCIe device of claim 20, further comprising:
a transaction layer operable to transfer the packets of the non-posted commands to the host.

* * * * *